W. SMITH.
SNOW CLEARING ATTACHMENT FOR AUTOMOBILES.
APPLICATION FILED JUNE 24, 1920.

1,407,895.

Patented Feb. 28, 1922.

Wilbur Smith, INVENTOR.

BY

Frank S. Ratcliffe, ATTORNEY.

UNITED STATES PATENT OFFICE.

WILBUR SMITH, OF SPRING GREEN, WISCONSIN.

SNOW-CLEARING ATTACHMENT FOR AUTOMOBILES.

1,407,895.     Specification of Letters Patent.     Patented Feb. 28, 1922.

Application filed June 24, 1920. Serial No. 391,397.

*To all whom it may concern:*

Be it known that I, WILBUR SMITH, a citizen of the United States, and resident of Spring Green, in the county of Sauk and State of Wisconsin, have invented certain new and useful Improvements in Snow-Clearing Attachments for Automobiles; and I do hereby declare that the following is a full, clear, and exact description thereof.

My invention relates to new and useful improvements in devices for clearing a roadway in advance of a vehicle, and is more particularly directed to the provision of driven means adapted to be mounted at the forward portion of a motor vehicle to clear a path for the same upon travel thereof.

In clearing a roadway of snow for the passage of motor vehicles, it is not necessary to entirely remove the snow from the roadway with a consequent excessive expenditure of time and power, but it is merely necessary to provide paths or trackways for the wheels of the vehicle.

It is therefore primarily the object of my invention to provide an attachment which may be applied to the forward portion of a motor vehicle and which is operable upon driving the vehicle to clear pathways in advance of the wheels of the vehicle so that, with a minimum expenditure of extra power the vehicle may rapidly progress along the snow-covered roadway and clear tracks for subsequent vehicles.

It is more particularly my object to provide an attachment of this character which may be readily applied to the front end portion of a motor vehicle in the manner of the usual bumper bracket, and which may receive its power directly from the crank shaft of the vehicle engine to thus provide an exceedingly simple and highly efficient attachment unit.

With the above and other objects and advantages in view, my invention resides more particularly in the novel combination, formation and arrangement of parts hereinafter described and pointed out in the appended claims.

In the accompanying drawings—

Figure 1:
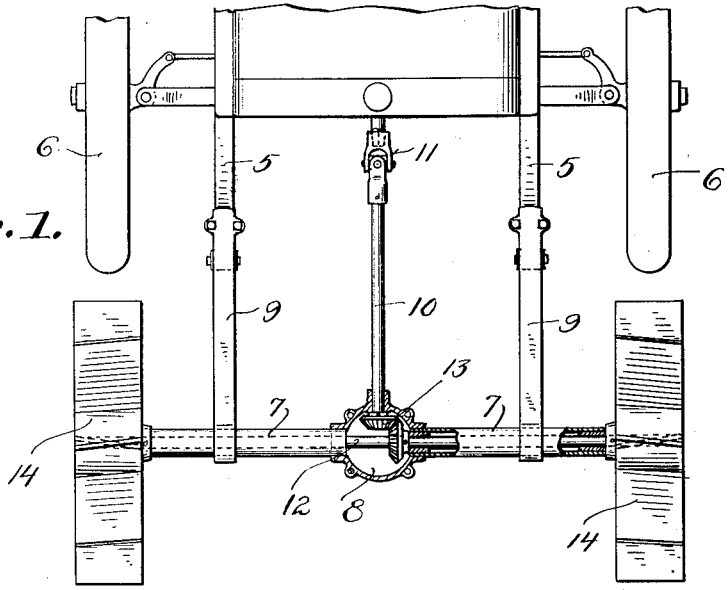
Figure 1 is a view partly in plan and partly in section, showing my improved snow clearing attachment secured to the forward end portion of a motor vehicle.
Figure 2:
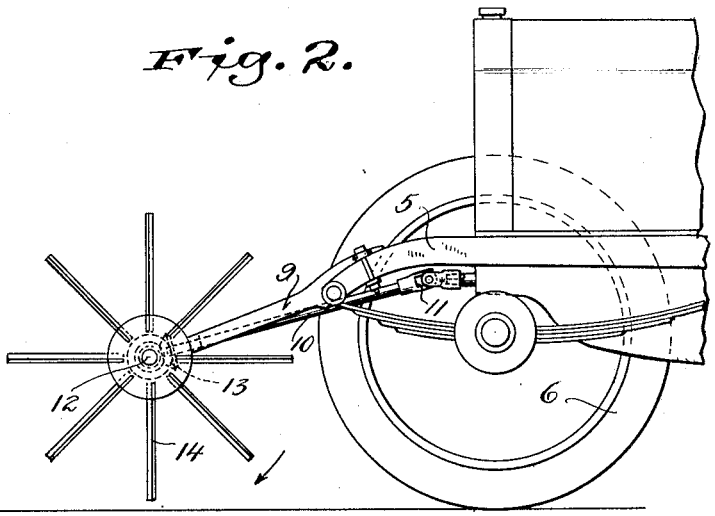
Figure 2 is a side view of the attachment and forward end portion of a vehicle.

Referring now more particularly to the accompanying drawings, 5 designates the forward end of each side sill of a motor vehicle frame and 6 designates each of the front wheels.

My improved snow clearing attachment comprises a pair of housing sleeves 7 connected by a central casing 8 forming a structure similar to the rear axle structure of a vehicle, and this housing is secured to the forward end portions of the frame sills by bracket arms 9 secured thereto in the usual manner of the arms of an ordinary bumper bracket whereby the housing structure is mounted transversely at the front of the vehicle being disposed a considerable distance forwardly of the front wheels. A shaft 10 extends from the casing 8 inwardly and has its inner end jointed at 11 for engagement of the forward end of the crank-shaft of the vehicle motor, and a second shaft 12 extends through the housing sleeves and casing 8 and has beveled gear connection 13 with the shaft 10 within the casing. The ends of the shafts 12 project beyond the housing sleeves and each carries a paddle wheel 14 disposed in advance of a corresponding front wheel of the motor vehicle. The blades of the paddle wheels 14 are preferably slightly inclined obliquely whereby to direct the snow toward the outer side of the path whereby to direct the snow outwardly of the path of travel of the vehicle upon driving rotation of said paddle wheels. The paddle wheels have sufficient clearance from the ground to prevent damage thereby, and said wheels obviously do not interfere with steering movement of the vehicle.

I have thus provided an exceedingly simple device which may be very readily attached to the forward portion of any motor vehicle of general construction, and which is effective to clear the snow from the paths of the wheels of the vehicle as said vehicle progresses, whereby to make an adequate track for travel of vehicles without the expenditure of the excessive amount of power which is necessary to provide clearance of the entire surface of the roadway with the type of road clearing devices heretofore contemplated.

While I have shown and described a preferred embodiment of my invention, it will be appreciated that various changes and modifications of structure may be employed to meet differing conditions of use without departing in any manner from the spirit of my invention.

What is claimed is:

1. A snow-clearing device for motor vehicles comprising a housing, bracket arms extending from said housing and adapted for securement to the vehicle structure to mount said housing transversely at the forward portion thereof, shafting in said housing, paddle-wheels carried by said shafting at the ends of the housing and located in advance of the wheels of the vehicle, a central shaft carried by the housing and adapted for connection with the motor shaft of the vehicle, and a drive connection between said last named shaft and said shafting.

2. In a device of the class described, the combination with a power driven vehicle and its engine crank shaft forward extension, of a snow clearing device comprising a pair of clearing members, means for mounting said clearing members in advance of the wheels of the vehicle, and means for driving said clearing members from said engine crank shaft forward extension.

3. In a device of the class described, the combination with a power driven vehicle, its engine crank shaft forward extension and the side sills of the vehicle frame, of a snow clearing device comprising a housing, bracket arms extending rearwardly from said housing in alignment with said frame side sills, means for attaching the rear ends of said brackets to the frame side sills, shafting in said housing, paddle wheels carried by said shafting at the ends of the housing and located in advance of the vehicle wheels, a rearwardly extending shaft having its forward end in driving connection with said housing shafting, and means drivingly connecting the rear end of said rearwardly extending shaft with the forward extension of the engine crank shaft.

In testimony that I claim the foregoing I have hereunto set my hand at Spring Green, in the county of Sauk and State of Wisconsin.

WILBUR SMITH.